United States Patent [19]

McAdams, Sr.

[11] 4,302,045
[45] Nov. 24, 1981

[54] ANTI-THEFT MECHANISM FOR REMOVABLE AUTOMOBILE ROOF PANELS

[76] Inventor: Luther J. McAdams, Sr., 1626 E. 91st Pl., Chicago, Ill. 60617

[21] Appl. No.: 90,905

[22] Filed: Nov. 5, 1979

[51] Int. Cl.$^3$ ............................................. B60J 7/18
[52] U.S. Cl. .............................. 296/224; 292/DIG. 5
[58] Field of Search ..................... 296/216, 218, 224; 85/3 K, 7, 8.6; 70/258, 259, 229, 230, 232; 292/DIG. 5

[56] References Cited

U.S. PATENT DOCUMENTS

| | | | |
|---|---|---|---|
| 2,223,876 | 12/1940 | Scanlan | 70/232 |
| 3,704,563 | 12/1972 | Waller | 85/8.6 |
| 3,712,665 | 1/1973 | Klein | 292/DIG. 5 |
| 3,818,731 | 6/1974 | Waling et al. | 70/232 |
| 3,975,935 | 8/1976 | Masterson | 70/232 |
| 4,093,256 | 6/1978 | McAdams, Sr. | 70/259 |
| 4,121,870 | 10/1978 | Oakey | 296/218 |

Primary Examiner—Joseph F. Peters, Jr.
Assistant Examiner—Ross Weaver
Attorney, Agent, or Firm—Kinzer, Plyer, Dorn & McEachran

[57] ABSTRACT

An anti-theft mechanism for a handle operated latching mechanism of a removable automobile roof panel of the type in which the handle pivots to latch and unlatch the panel relative to the automobile roof. The anti-theft mechanism includes a fixed post positioned adjacent the handle. A keeper bar, preferably angle shaped, is formed with an opening adjacent one end which opening fits over the fixed post so that the keeper bar can be positioned to engage the handle to prevent pivotal movement thereof. A locking mechanism is provided which engages the fixed post and the keeper bar to prevent removal of the keeper bar from the fixed post. In one embodiment of the invention, the locking mechanism includes a nut which is threadedly engaged with the fixed post and the keeper bar and a lockable housing which swivels on the fixed post and encloses the nut so it cannot be removed.

3 Claims, 3 Drawing Figures

ANTI-THEFT MECHANISM FOR REMOVABLE AUTOMOBILE ROOF PANELS

SUMMARY OF THE INVENTION

This invention is concerned with an anti-theft mechanism for removable automobile roof panels. It is especially concerned with an anti-theft mechanism for an automobile roof panel which has a handle operated latching mechanism of the type in which the handle pivots to latch and unlatch the panel relative to the automobile roof.

The promulgation and enforcement of federal safety regulations for automobiles has brought about the demise of the once popular convertible. In its place, the automotive manufacturers have introduce the sports automobile with what is called a T-bar roof. The T-bar roof has two openings each enclosed with removable glass panels. One opening is located on each side of the auto and is positioned above the door with a center strip of metal between the openings forming the leg of the so-called T. The glass panels can be lifted out of the openings in the roof and stored in the trunk of the automobile so that the driver and passengers will experience at least some of the open air sensation of the old time convertible.

Because these panels are designed to be easily removable by the driver of the automobile, they can also be easily removed by thieves. Due to the relatively high cost of these panels and their ease of removal, these panels have become a prime target for thieves.

Therefore, an object of this invention is an anti-theft mechanism for such roof panels which can be readily installed as a non-factory item.

Another object of this invention is an anti-theft mechanism which is relatively easy for the owner of the automobile to engage and disengage when removal of the roof panels is desired.

Another object of this invention is an anti-theft mechanism for removable roof panels which is not easily opened by a would be thief.

Other objects of this invention may be found in the following specification, claims and drawings.

BRIEF DESCRIPTION OF THE DRAWINGS

Invention is illustrated more or less diagrammatically in the following drawings wherein.

DESCRIPTION OF THE PREFERRED EMBODIMENTS

Figure 1:
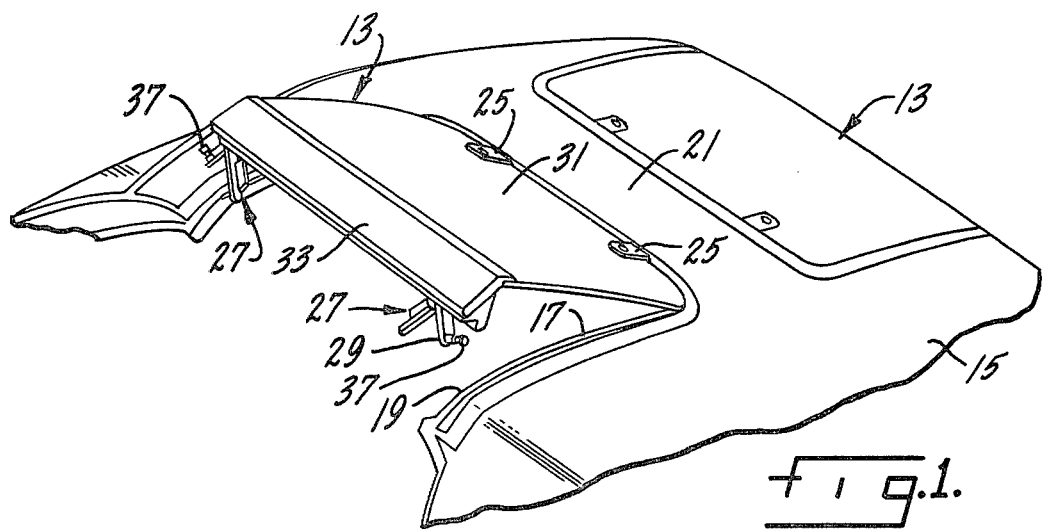
FIG. 1 is a partial perspective view of an automobile equipped with removable roof panels, with one panel shown in a partly open position and the other panel shown in its closed position.
Figure 2:
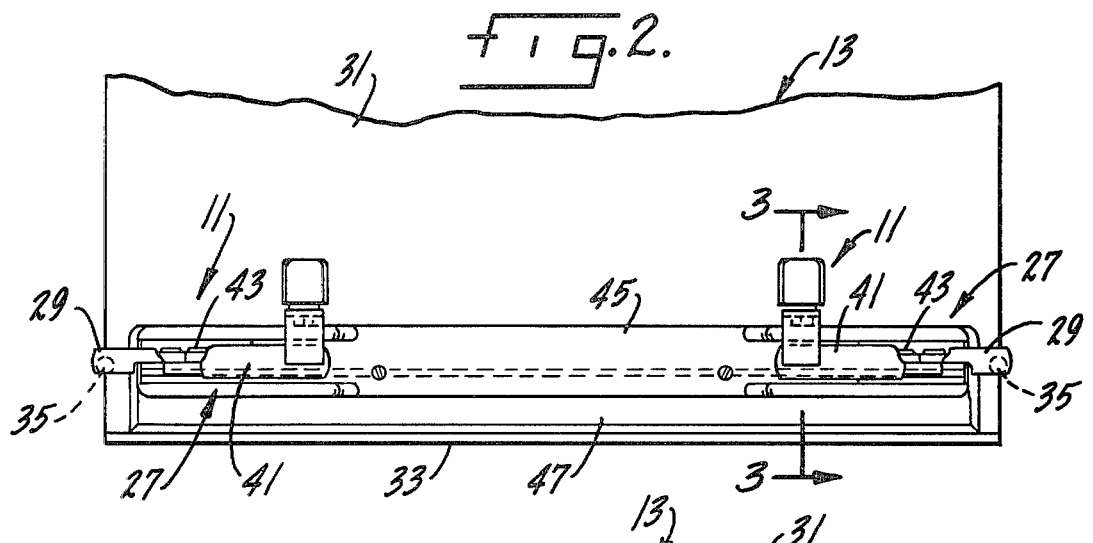
FIG. 2 is a partial underside plan view of the outer end of a roof panel showing the latching mechanisms in their closed positions and the anti-theft mechanisms of this invention installed.
Figure 3:
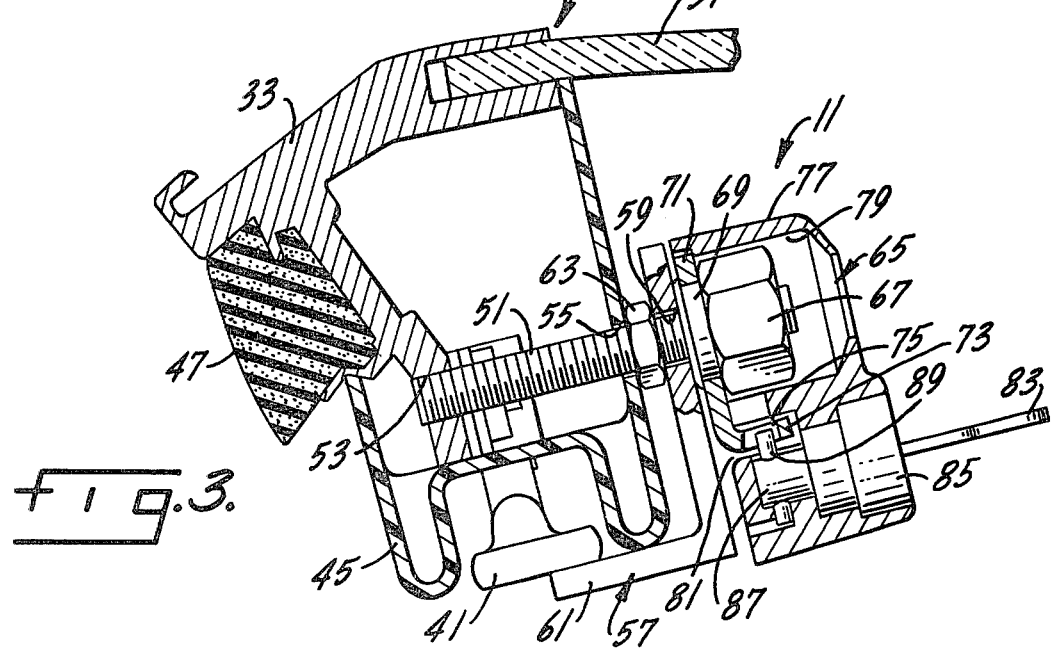
FIG. 3 is an enlarged cross sectional view taken along line 3—3 of FIG. 2.

The anti-theft mechanism 11 of my invention is intended for use with removable roof panels 13 of the type shown in FIG. 1 of the drawings. Such roof panels are installed on opposite sides of an auto roof 15 above the doors. Each is intended to be lifted into and out of a channel 17 formed around an opening 19 in the roof. The typical two door sports type auto has one panel on each side of the roof with the openings for the panels separated by a longitudinally extending portion 21 of the roof which separates the roof into a somewhat T-shaped configuration. From this construction, such automobiles have acquired the name T-bar roof automobile.

The roof panels 13 are pivotally mounted relative to the auto roof 15 by means of metal tabs 25 located on the inner edge of the roof panel which fit into the sockets (not shown) located in the channel 17. When seated in the channels, the panels are held in place by one or more handle operated latching mechanisms 27. Each latching mechanism has a latch 29 at the side edge of the panel which latch engages the underside of the roof of the automobile adjacent the edge of the channel. Some automobile manufacturers provide a panel with one handle which operates latches on opposite sides of the panel while at least one other auto manufacturer provides a panel having a handle on each side for each latch. The latter construction is shown in the drawings. My invention is adaptable to either type of handle operated latching mechanisms.

Automobile manufacturers do not presently provide a locking mechanism to prevent unauthorized operation of the latching handles and subsequent removal of the panels from their channels. The would-be thief need only gain entrance to such an automobile and there is nothing to prevent him from removing the roof panels simply by operating the latch handles.

The anti-theft mechanism 11 of this invention is designed to be readily applicable for non-factory installation on all types of automobile roof panels having latch handles which pivot during latching and unlatching of the roof panels. Of course, it is also adaptable to factory installation by the auto manufacturers.

The typical roof panel 13 is formed of a generally rectangular sheet of glass 31 which is usually tinted and is slightly curved from its outer edge to its inner edge in order to conform to the contour of the roof of the automobile in which it is installed. An elongated metal extrusion 33 is fastened to the outer edge of the roof panel. The handle operating latching mechanisms 27 are attached to the extrusion and are usually located at opposite side edges thereof. The latches 29 pivot into and out of clamping engagement with the roof of the automobile to secure the panel in position once it is seated in the channel 17 of the roof opening 19. The roof engaging ends of the latches are equipped with studs 35 having rubber bumpers 37 in the ends thereof to resiliently engage the roof. Each latch mechanism includes a handle 41 which pivots about a point 43 to move the latch 29 between latched and unlatched positions.

For appearance sake, the extrusion 33 and portions of the latch mechanism 27 are enclosed by a plastic housing 45 which is fastened to the extrusion. The latches and the latch operating handles extend through openings formed in this housing. A gasket 47 is attached to the extrusion to form a weather tight seal between the roof panel 13 and the top of the door of the auto.

The anti-theft mechanism 11 of my invention includes a post 51, usually threaded, which is fastened to the extrusion 33 adjacent to a latch operating handle 41. In this embodiment, the post threads into a threaded hole 53 formed in the extrusion. With some forms of construction, it may be desirable to securely fasten the post 51 to the extrusion by means of a pin, a jamb nut or by other conventional means which have not been shown. The post 51 extends through an opening 55 formed in the plastic housing 45 to extend above the housing. A metal keeper bar 57 in the shape of an angle is formed with an opening 59 adjacent one end thereof. This opening fits over the post 51 so that one leg 61 of the keeper bar engages the latch operating handle 41 when it is in its closed position to prevent unauthorized pivotal movement of this handle. To properly position the keeper bar, a spacer nut 63 threads over the post and is located between the housing 45 and the keeper bar. The keeper bar is held in position on the post by a commercially available locking mechanism 65.

The locking mechanism 65 includes a nut 67 having an integrally formed flared skirt 69 at one end thereof. A latch 71 is pivotally secured between the flared skirt and the nut. The latch has a bent end 73 with an opening 75 formed therein. The locking mechanism also includes a housing 77 having a chamber 79 which receives the nut 67 and a chamber 81 which receives the bent end 73 of the latch 71. A key 83 operated cylinder lock 85 has a shaft 87 with a projection 89 which fits in the opening 75 of the latch 71 to secure the housing to the latch 71. With the housing locked to the latch, the latch and housing will pivot on the post 51 while completely enclosing the nut 67 so that it cannot be removed. One advantage of locking mechanism 65 is that the fixed post 51 need not be securely fastened to the extrusion, that is not secured against rotation, because the housing 77 completely encloses both the locking nut 67 and the fixed post 51.

It should be understood and appreciated that the invention is not limited to use of the commercially available locking mechanism 65 but can be used with other types of locking mechanisms which can be adapted to prevent removal of the keeper bar 57 from the post 51.

I claim:

1. An anti-theft mechanism for a handle operated latching mechanism of a removable automobile roof panel of the type in which the handle pivots to latch and unlatch the panel, said mechanism including:
   a post secured against axial movement relative to the handle and positioned adjacent the handle,
   a keeper bar having an opening which slidably receives the post to position a portion of the bar in the path of opening pivotal movement of the handle to prevent such opening movement, which opening is sized relative to the post to prevent lateral movement of the keeper bar relative to the post, and
   a locking means engageable with the post to prevent removal of the keeper bar from the opening path of the handle and disengageable with the post to permit removal of the keeper bar from the post.

2. The anti-theft mechanism of claim 1 in which the locking mechanism attaches to the free end of the post outwardly of the keeper bar.

3. The anti-theft mechanism of claim 2 in which the post is threaded, the locking means includes a nut which threads over the fixed post and engages the keeper bar, a latch pivotally attached to the nut and a key operated housing which engages the latch and encloses the nut to prevent removal thereof.

* * * * *